United States Patent Office 3,764,287
Patented Oct. 9, 1973

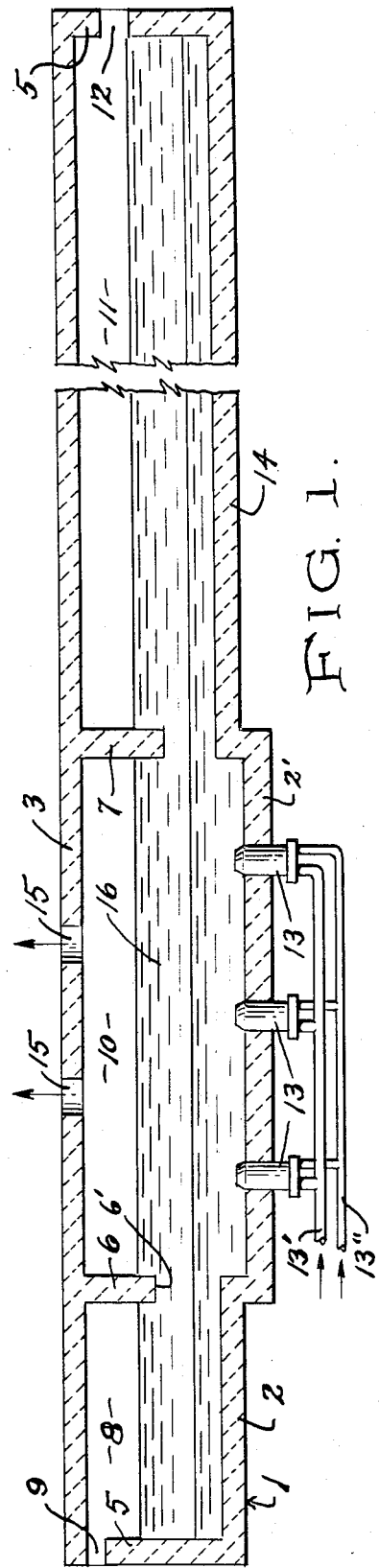
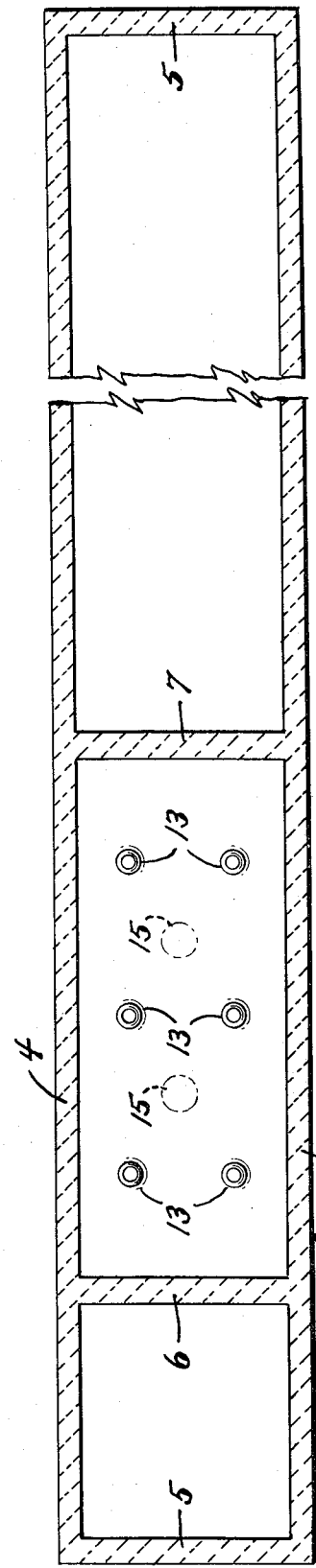

3,764,287
METHOD OF AN APPARATUS FOR MELTING AND REFINING GLASS
George D. Brocious, R.D. 1, Mayport, Pa. 16240
Filed Mar. 20, 1972, Ser. No. 236,480
Int. Cl. C03b 5/04
U.S. Cl. 65—136      6 Claims

ABSTRACT OF THE DISCLOSURE

A method of and apparatus for melting and refining glass, wherein the glass charge is admitted and advanced continuously through a furnace containing an induction medium preferably consisting of a molten metal, such as tin, which is maintained in a reduced or molten state by a source of heat submerged therein, and the furnace defining separate pre-melt, melting and refining chambers through which the glass charge is successively advanced in a buoyant molten state over the induction medium common to said pre-melt, melting and refining zones until the molten glass is discharged from the furnace in the desired refined state.

---

The present invention relates to the melting of glass, and more particularly, to an improved method of and apparatus for melting and refining glass in large quantities in a more efficient and economical manner than has formerly been achieved in commercial practice.

According to my invention, I utilize a furnace of the tank type and in which a heat transfer agent is contained in the bottom of the furnace in the form of a molten metallic induction medium, such as tin, and having heating means submerged therein to maintain the induction medium in a reduced state and at a high temperature preferably near the boiling point thereof in at least the immediate zone of the heating means. The induction medium is distributed throughout the bottom of the furnace tank in a molten layer of suitable depth, and acts as an effective heat sink and consequent heat source for melting glass admitted to the furnace. The molten glass forms a buoyant layer which advances by the aid of gravity and surface tension through an initial pre-melt zone, then through a main melting zone, and finally through a refining zone from which the glass is ultimately discharged from the opposite end of the furnace in the desired highly refined condition. Transverse baffle walls depending from the top of the furnace but terminating above the induction medium, divide the furnace into the aforementioned pre-melt, melting and refining zones, respectively, with the main melting zone preferably being about twice the length of the pre-melt zone, and the refining zone preferably being about twice the length of the main melting zone. This arrangement, coupled with the use of the induction medium with a submerged source of heat, as referred to in the foregoing, attains an exceptionally high efficiency with a minimum required area, and minimizes wear of the refractory surfaces of the furnace, so that smaller furnaces of greater capacity, with more economical operation and lower overall production costs can be utilized.

Other and further objects and advantages of my invention will be hereinafter described or will become apparent from reference to the accompanying drawing and the novel features thereof defined in the appended claims.

In the drawing:

FIG. 1 is a view in vertical section of a glass melting and refining furnace embodying my invention; and FIG. 2 is a horizontal sectional view as taken throughout the furnace of FIG. 1, but omitting the glass and the induction medium appearing in FIG. 1.

Referring to the drawing, there is shown a furnace having the form of a large tank generally designated 1 which is preferably of rectangular form and of considerably greater length than width, said tank having a bottom wall 2, top wall 3, side walls 4, 4, and end walls 5, 5. These walls are preferably made of refractory material, or from other material lined with refractory, as commonly utilized in glass melting furnaces.

Depending from the top wall 3 are baffle walls 6 and 7 which are transversely extended between the side walls 4, 4 in parallel spaced relation to each other, with their lower ends 6' and 7' respectively terminating in spaced relation to the bottom wall 2, but the lower ends of both baffles being submersible in the molten glass when the furnace is in operation. These baffle walls divide the furnace into three separate chambers, the first of which is a pre-melt chamber designated 8 having an inlet or charge admitting opening 9 at one end of the furnace tank. The second chamber, designated 10, is the main melting chamber, and is preferably twice the length of the pre-melt chamber 8, while the third chamber, designated 11, is preferably twice the length of the main melting chamber 10 and constitutes a refining chamber having an outlet or discharge opening 12 at the opposite end of the furnace tank remote from the inlet 9.

The dimensions of the furnace can be determined according to any desired capacity, but a typical furnace of average working capacity would preferably have an interior width of about 8 feet, a general height of about 5 feet, and an overall length of about 70 feet, with the pre-melt chamber being about 10 feet long, the main melting chamber about 20 feet long, and the refining chamber about 40 feet long. It is to be understood, however, that these dimensions are merely illustrative and my invention is not limited thereto.

Located in the bottom of the main melting chamber 10 is a plurality of heating units 13, each of which preferably has the form of a gas-fired burner having gas and air feed lines, respectively designated 13' and 13" connected thereto and leading from a convenient source of gas and air (not shown). In the zone of burners 13, the bottom wall 2' of the main melting chamber 10 is preferably about 1 foot lower than the bottom wall 2 in the pre-melt and the refining chambers, and the burner nozzles project only slightly above the bottom wall 2' so that they will be well submerged in an induction medium designated 14 which is to be contained in the bottom of the furnace tank, as more particularly described in the following.

Before admitting glass to the furnace, the furnace is charged with a suitable metallic induction medium, preferably tin, which covers the bottom of the furnace tank throughout the furnace to an appropriate depth (about 1 foot deep in both the pre-melt and refining chambers and about 2 feet deep in the main melting chamber, in the case of illustrative furnace size described in the foregoing). As shown in FIG. 1 of the drawing, the upper surface of the induction medium 14 lies somewhat below the lower ends 6' and 7' of the baffle walls 6 and 7, while the burners 13 are submerged well below the surface of the induction medium. The burners are so controlled in any appropriate manner as to maintain the molten tin preferably at a temperature near the boiling point thereof (near 2270° C.), at least in the immediate zone of the burners, so as to maintain a high temperature throughout the furnace. Exhaust ports 15, 15 are provided in the top wall 3 of the furnace tank above the burner area to allow escape of burning gases and other exhaust products. If desired, these exhaust ports can be connected to recuperators (not shown) which can be utilized to preheat the gas and air burner fuel to achieve improved efficiency of burner combustion and fuel economy.

When the furnace is in operating condition as described, batch glass, usually composed of sand, lime, feldspar and cullet, is admitted into the furnace through the inlet 9, until the molten glass forms a buoyant layer 16 of substantial depth above the induction medium and submerges the lower ends 6', 7' of the baffles therein to a substantial depth. As the glass passes through the pre-melt chamber 8, the volatile alkalies and particularly dust are trapped in that chamber by the submerged baffle 6 and go into solution before they reach the main melting chamber, thereby reducing the corrosive effect on the refractory furnace surfaces and the exhaust fixtures. In the main melting chamber 10 where the heat transfer between the fuel and the induction medium 14 occurs, some of the heat goes directly to the glass which forms buoyant layer 16 (preferably about 2 feet in depth) on the surface of the molten tin 14, as the burning gases exit first through the tin and then through the glass itself, after which the gases exit through the exhaust ports 15, preferably at a minimum temperature of about 1500° C. Submersion of the lower end 7' of the baffle 7, located between the melting and refininng chambers, to a substantial depth in the molten glass layer 16 prevents floating imperfections such as incompletely melted glass particles of lower density, as well as any slag or foam particles, from entering the refining chamber where they would otherwise hinder and slow down the refining action in the refining chamber 11. By maintaining the tin at a sufficiently high temperature, preferably in the range of about 2000° C. to about 2270° C., the possibility of forming a solution of the tin with the glass is avoided or minimized, and the glass is maintained in a highly stable glassy state which prevents any solution of the tin therein.

When the glass passes into the refining chamber 11, it is freed of seeds and bubbles and fined to the desired quality before it is discharged at the exit 12 for delivery to the point of use.

It will be seen from the foregoing that my method and apparatus allows the melting of large quantities of glass in a minimum of required space and insures the production of glass of high quality in a minimum of time and at exceptionally high efficiency and low cost of production.

While the specific details of my invention have been shown and described herein, the invention is not confined thereto, and other changes or alterations can be made without departing from the spirit thereof as defined in the appended claims.

I claim:

1. The method of continuously melting and refining glass in a tank furnace having a plurality of transverse baffles depending from the top of the furnace but terminating in spaced relation to the bottom of the furnace, said baffles defining premelt, melting and refining chambers communicating with one another below the baffles in successive order, and the melting chamber having a source of heat generation in the form of combustion heaters disposed in the bottom thereof, said method comprising the steps of establishing in the bottom of the furnace a continuous induction medium common to the chambers aforesaid and consisting of a body of molten metal in which the combustion heaters are submerged and which is maintained in a molten state throughout the furnace and at a temperature near the boiling point of the induction medium in at least the zone of the combustion heaters, admitting a glass batch to the pre-melt chamber at one end of the furnace to establish a buoyant layer of molten glass on the surface of the induction medium and maintaining the depth of the molten glass layer at a level throughout the furnace sufficient to submerge the lower ends of the baffles in the molten glass, while allowing the molten glass to freely advance at a controlled rate aided by the influence of gravity and surface tension over the surface of the induction medium without mixing with the latter as the glass passes successively first through the pre-melt chamber in which substantially all dust and the usual volatile alkalies are trapped by the first baffle and reduced into solution with the molten glass before the molten glass then passes to the melting chamber in which any floating imperfections and incompletely melted glass particles are trapped by a second baffle before the molten glass finally passes to the refining chamber where it is freed of seeds and bubbles before being discharged from the opposite end of the furnace in the desired refined state.

2. The method of melting and refining glass according to claim 1, in which the heat generated in the melting chamber of the furnace is so controlled as to maintain the temperature in the melting chamber near 2270° C. at least in the immediate zone of the heat source, and within the range of about 2000° C. to 2270° C. throughout the induction medium.

3. A furnace for melting and refining glass, comprising a tank of substantially greater length than width and having bottom, top, side and end walls, a pair of baffles depending from the top wall and extended transversely between the side walls in substantially spaced parallel relation to each other, said baffles terminating above the bottom wall and dividing the tank into pre-melt, melting and refining chambers, respectively, with the chambers being in successive open communication with one another below the baffles aforesaid, a plurality of combustion heaters disposed within the melting chamber at the bottom thereof, a metallic induction medium contained in the bottom of the furnace tank to a predetermined depth but spaced below the baffles and in which the heaters are submerged to maintain the induction medium in a molten state throughout the full length of the furnace tank, said pre-melt chamber having means for admitting a glass batch therein at one end of the furnace to allow pre-melting of the batch and subsequent advancement of the same in a buoyant layer over the surface of the molten induction medium through the successive chambers at a controlled rate and at a depth sufficient to submerge the lower ends of the baffles therein, the top wall of the furnace having exhaust ports provided therein in the area of the melting chamber above the heaters aforesaid, and the refining chamber having exit means for discharging the glass in the desired refined state at the remote end of the furnace.

4. A glass melting and refining furnace as defined in claim 3, wherein the length of the melting chamber is approximately twice the length of the pre-melt chamber.

5. A glass melting and refining furnace as defined in claim 3, wherein the length of the melting chamber is approximately twice the length of the pre-melt chamber, and the length of the refining chamber is approximately twice the length of the melting chamber.

6. A glass melting and refining furnace as defined in claim 3, combined with regulator means for the heaters to maintain the induction medium at a temperature near 2270° C. in the immediate zone of the heaters and in the range of about 2000° C. to 2270° C. throughout the induction medium.

References Cited
UNITED STATES PATENTS 3,361,550   1/1968   Murphy et al. ____ 65—182 R X
3,248,205   4/1966   Dolf et al. _____ 65—335

ARTHUR D. KELLOGG, Primary Examiner

U.S. Cl. X.R.

65—182 R, 337